United States Patent
Manohar (10) Patent No.: US 7,447,236 B2
(45) Date of Patent: Nov. 4, 2008

(54) METHOD AND APPARATUS FOR DETERMINING AN ARRIVAL TIME ASSOCIATED WITH A SYNCHRONIZATION BURST

(75) Inventor: Bollapragrada V. J. Manohar, La Jolla, CA (US)

(73) Assignee: Siemens Aktiengesellschaft, Munich (DE)

( * ) Notice: Subject to any disclaimer, the term of this patent is extended or adjusted under 35 U.S.C. 154(b) by 1260 days.

(21) Appl. No.: 10/392,996

(22) Filed: Mar. 19, 2003

(65) Prior Publication Data

US 2004/0097249 A1 May 20, 2004

Related U.S. Application Data

(60) Provisional application No. 60/426,508, filed on Nov. 14, 2002.

(51) Int. Cl.
*H04J 3/06* (2006.01)
*H04B 7/212* (2006.01)

(52) U.S. Cl. ........................ 370/503; 370/324
(58) Field of Classification Search ............ None
See application file for complete search history.

(56) References Cited

U.S. PATENT DOCUMENTS

| | | | |
|---|---|---|---|
| 5,293,423 A * | 3/1994 | Dahlin et al. | 380/272 |
| 5,838,672 A * | 11/1998 | Ranta | 370/335 |
| 5,995,499 A * | 11/1999 | Hottinen et al. | 370/337 |
| 6,198,935 B1 | 3/2001 | Saha et al. | |
| 6,223,040 B1 | 4/2001 | Dam | |
| 6,256,505 B1 | 7/2001 | Kingdom et al. | |
| 6,366,569 B1 * | 4/2002 | Ritter | 370/337 |
| 6,470,185 B2 | 10/2002 | Kangas et al. | |
| 6,522,644 B2 | 2/2003 | Bergkvist | |
| 6,522,887 B2 * | 2/2003 | Larsson et al. | 455/456.5 |
| 6,621,813 B2 * | 9/2003 | Petch et al. | 370/350 |
| 6,707,807 B1 * | 3/2004 | Menzel | 370/337 |
| 6,865,175 B1 * | 3/2005 | Ritter | 370/345 |
| 6,885,693 B1 * | 4/2005 | Burton | 375/142 |
| 6,931,030 B1 * | 8/2005 | Dogan | 370/509 |
| 6,990,093 B1 * | 1/2006 | Rantalainen et al. | 370/350 |
| 2002/0009065 A1 * | 1/2002 | Molko | 370/337 |
| 2002/0159416 A1 * | 10/2002 | Kazmi et al. | 370/335 |
| 2004/0198366 A1 * | 10/2004 | Crocker et al. | 455/452.1 |
| 2004/0240480 A1 * | 12/2004 | Hiben et al. | 370/514 |

OTHER PUBLICATIONS

"3GPP TS 05.03 V8.6.1 (Jan. 2001)", 3rd Generation Partnership Project; Technical Specification Group GERAN; Channel coding (Release 1999); 115 pages.

* cited by examiner

*Primary Examiner*—Kwang B. Yao
*Assistant Examiner*—Warner Wong (57) ABSTRACT

Embodiments of the present invention provide a system, method, apparatus, means, and computer program code for determining an arrival time for a synchronization burst provided by a base terminal station. According to embodiments of the present invention, a mobile station may use the training sequence code of a synchronization burst and additional data from the synchronization burst to conduct a correlation in order to determine the arrival time of the synchronization burst. That is, the mobile station may use left side data bits and/or the right side data bits of the synchronization burst in addition to the training sequence code in the correlation to determine a more accurate arrival time or time stamp for the synchronization burst.

36 Claims, 6 Drawing Sheets

METHOD AND APPARATUS FOR DETERMINING AN ARRIVAL TIME ASSOCIATED WITH A SYNCHRONIZATION BURST

CROSS-REFERENCE TO RELATED APPLICATION

This application is related to, and claims priority to, U.S. provisional patent application Ser. No. 60/426,508, entitled A METHOD TO IMPROVE E-OTD ACCURACY BY ENHANCED CORRELATION OF SCH, and filed Nov. 14, 2002, the contents of which are incorporated herein for all purposes.

BACKGROUND OF THE INVENTION

The present invention relates to a method and apparatus for determining an arrival time associated with a synchronization burst.

In many GSM (Global System for Mobile Communication) implementations, a mobile station may need to determine the arrival time of a synchronous burst provided by a base terminal. For example, the mobile station may use the arrival times of synchronization bursts from two different base terminal stations to determine an observed time difference (OTD) that may be used to determine the location of the mobile station. One of the base terminal stations may be in a serving cell relative to the mobile station while the other base terminal station may in a neighbor cell relative to the mobile station.

Unfortunately, noise and other co-channel interference may make it difficult for the mobile station to determine the arrival time accurately for the synchronization burst, particularly when the synchronization burst is provided by a base terminal station operating in a different cell than the mobile station.

It would be advantageous to provide a method and apparatus that enabled a mobile station to determine an accurate arrival time for a synchronization burst.

SUMMARY OF THE INVENTION

Embodiments of the present invention provide a system, method, apparatus, means, and computer program code for determining an arrival time for a synchronization burst provided by a base terminal station. According to embodiments of the present invention, a mobile station may use the training sequence code of a synchronization burst and additional data from the synchronization burst to conduct a correlation in order to determine the arrival time of the synchronization burst. That is, the mobile station may use left side data bits and/or the right side data bits of the synchronization burst in addition to the training sequence code in the correlation to determine a more accurate arrival time or time stamp for the synchronization burst.

Additional objects, advantages, and novel features of the invention shall be set forth in part in the description that follows, and in part will become apparent to those skilled in the art upon examination of the following or may be learned by the practice of the invention.

According to some embodiments of the present invention, a method for determining an arrival time associated with a synchronization burst may include determining first data indicative of a training sequence code associated with a first synchronization burst; determining a first set of data bits associated with the first synchronization burst; receiving the first synchronization burst from a base station; determining, from the first synchronization burst, second data indicative of the training sequence code; determining, from the first synchronization burst, a second set of data bits associated with the synchronization burst; and determining a first arrival time associated with the first synchronization burst based on the first data indicative of the training sequence code, the second data indicative of the training sequence code, the first the of data bits, and the second set of data bits. In some other embodiments of the present invention, a method for determining an arrival time associated with a synchronization burst may include receiving assistance data; determining, from the assistance data, first data indicative of a training sequence code associated with a first synchronization burst and a first set of data bits associated with the first synchronization burst; receiving the first synchronization burst from a base station; determining, from the first synchronization burst, second data indicative of the training sequence code and a second set of data bits associated with the synchronization burst; and determining a first arrival time associated with the first synchronization burst based on the first data indicative of the training sequence code, the second data indicative of the training sequence code, the first the of data bits, and the second set of data bits.

In some additional embodiments of the present invention, a system for determining an arrival time associated with a synchronization burst may include a memory; a communication port; and a processor connected to the memory and the communication port, the processor being operative to determine first data indicative of a training sequence code associated with a first synchronization burst; determine a first set of data bits associated with the first synchronization burst; receive the first synchronization burst from a base station; determine, from the first synchronization burst, second data indicative of the training sequence code; determine, from the first synchronization burst, a second set of data bits associated with the synchronization burst; and determine a first arrival time associated with the first synchronization burst based on the first data indicative of the training sequence code, the second data indicative of the training sequence code, the first the of data bits, and the second set of data bits. In other embodiments, the processor may implement other methods described herein.

In some further embodiments of the present invention, an apparatus for determining an arrival time associated with a synchronization burst may include means for obtaining determining first data indicative of a training sequence code associated with a first synchronization burst; means for obtaining a first set of data bits associated with the first synchronization burst; means for obtaining receiving the first synchronization burst from a base station; means for obtaining determining, from the first synchronization burst, second data indicative of the training sequence code; means for obtaining, from the first synchronization burst, a second set of data bits associated with the synchronization burst; and means for obtaining determining a first arrival time associated with the first synchronization burst based on the first data indicative of the training sequence code, the second data indicative of the training sequence code, the first the of data bits, and the second set of data bits. In other embodiments, other means may be used.

In some other embodiments of the present invention, a computer program product in a computer readable medium for determining an arrival time associated with a synchronization burst may include first instructions for obtaining determining first data indicative of a training sequence code associated with a first synchronization burst; second instructions for obtaining a first set of data bits associated with the first synchronization burst; third instructions for obtaining receiving the first synchronization burst from a base station; fourth instructions for obtaining determining, from the first synchronization burst, second data indicative of the training sequence code; fifth instructions for obtaining, from the first synchronization burst, a second set of data bits associated with the synchronization burst; and sixth instructions for obtaining determining a first arrival time associated with the first synchronization burst based on the first data indicative of the training sequence code, the second data indicative of the training sequence code, the first the of data bits, and the second set of data bits. In other embodiments, a computer program may implement other methods described herein.

With these and other advantages and features of the invention that will become hereinafter apparent, the nature of the invention may be more clearly understood by reference to the following detailed description of the invention, the appended claims and to the several drawings attached herein.

DETAILED DESCRIPTION OF SPECIFIC EMBODIMENTS

There is a market opportunity for systems, means, computer code, devices, and methods that facilitate determination of an arrival time for a synchronization burst. In some embodiments or implementations of a mobile network such as a GSM (Global System for Mobile Communication) network or system, a synchronization burst may be sent by a base terminal station (BTS), also referred to as "base station", or other device and received or detected by a mobile station (MS) or other device. The mobile station and the base terminal station may use the synchronization burst to synchronize themselves.

In some embodiments, the mobile station may receive or detect synchronization bursts from multiple base terminal stations. For example, now referring to FIG. 1, a network 100 includes or may be divided into multiple cells 102, 104, 106, each of which may provide coverage for a limited geographic area. While the cells 102, 104, 106 are shown as having a specific shape and alignment, such shapes and alignments are done merely for purposes of illustration, but not limitation, of the present invention. A mobile station 110, such as a handset, cellular or radio telephone, etc. may be operating in one of the cells (e.g., the cell 102) and/or moving such that it changes location, changes cells, etc. Each of the cells 102, 104, 106 may include one or more base terminal stations 114, 116, 118, 120, each of which communicate with mobile stations.

Figure 1:
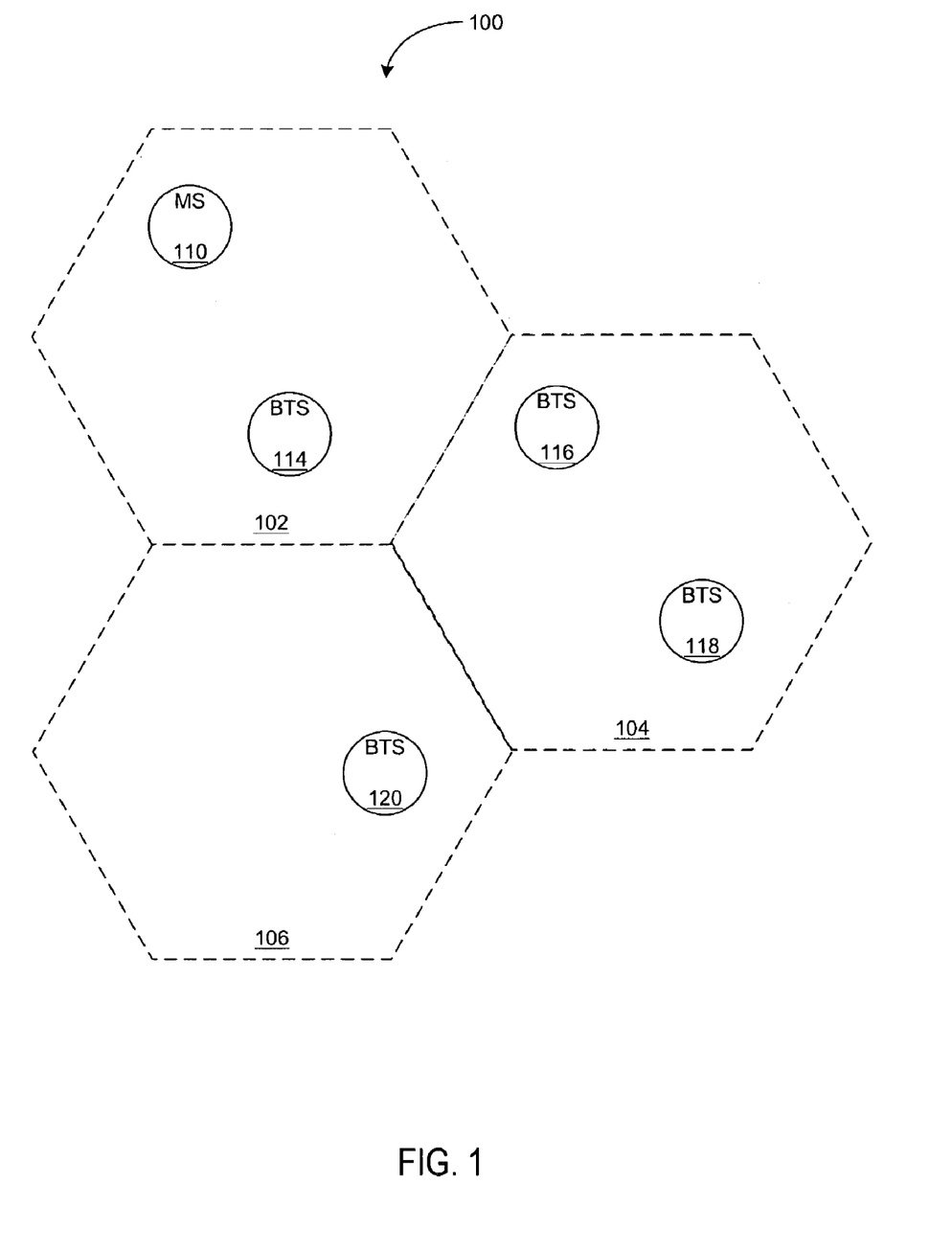
FIG. 1 is an illustration of a mobile station and multiple base stations.

Each of the base terminal stations 114, 116, 118, 120 may send out synchronization channel bursts (SCH), also referred to herein as "synchronization bursts" in accordance with GSM standards, conventions, and protocols, according to a specific embodiment. A synchronization burst from a base terminal station may include a base station identifier code (BSIC) associated with the base terminal station, a training sequence code, and TDMA (Time Division Multiple Access) frame number information.

In some situations, the mobile station 110 may receive or detect synchronization bursts from multiple base terminals stations. For example, now referring to FIG. 2, the mobile station 110 may receive or detect a synchronization burst 150 from the base terminal station 114 for the cell 102, referred to as the serving cell. The synchronization burst 150 may include up to sixty-four bits that comprise a training sequence code. For example, a training sequence code can be (1, 0, 1, 1, 1, 0, 0, 1, 0, 1, 1, 0, 0, 0, 1, 0, 0, 0, 0, 0, 0, 1, 0, 0, 0, 0, 0, 0, 1, 1, 1, 1, 0, 0, 1, 0, 1, 1, 0, 1, 0, 1, 0, 0, 0, 1, 0, 1, 0, 1, 1, 1, 0, 1, 1, 0, 0, 0, 0, 1, 1, 0, 1, 1) and is the same for all cells and synchronization bursts.

Figure 2:
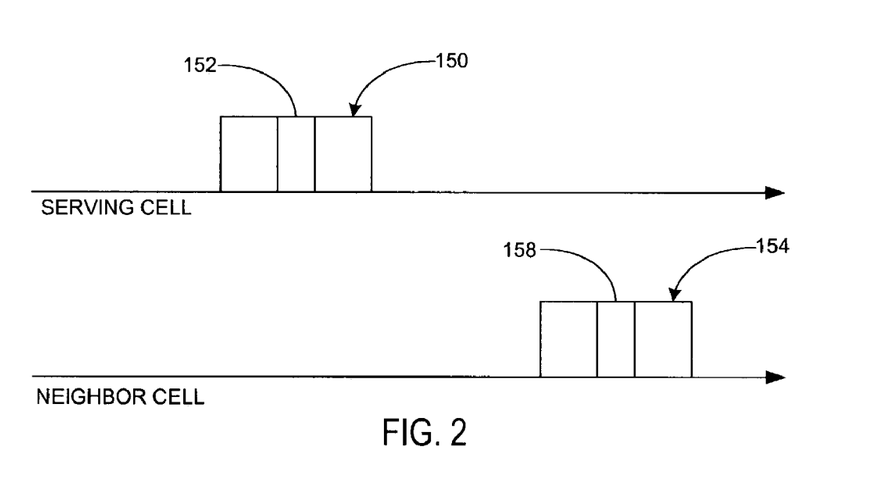
FIG. 2 is an illustration of synchronization bursts that may be sent by base stations in different cells and received by the mobile station of FIG. 1.

The mobile station 110 also may receive or detect a synchronization burst 154 from the base terminal station 120 for the cell 106, referred to as the neighbor cell. In some embodiments, the serving cell may be considered as the cell in which the mobile station 110 current is present. Alternatively, in some embodiments the serving cell may be the cell whose associated base terminal station is providing the strongest signal to the mobile station 110. For purposes of this example, the cell 102 is considered to be the serving cell for the mobile station 110 while the cell 106 is considered to be the neighbor cell for the mobile station 110. Such designations may change as the mobile station 110 moves around.

In some scenarios, the mobile station 110 may need to determine and/or report the difference in arrival times between two synchronization bursts as observed by the mobile station 110. For example, now referring to FIG. 3, the mobile station 110 may need to report the observed time difference (OTD) between an arrival time 166, denoted as time T1, for the synchronization burst 150 and an arrival time 168, denoted as time T2, for the synchronization burst 154. The time T1 represents the arrival time or time stamp of the synchronization burst 150 while the time T2 represents the arrival time or time stamp of the synchronization burst 154 from the perspective of the mobile station 110. Thus, the observed time difference is T2 minus T1.

Figure 3:
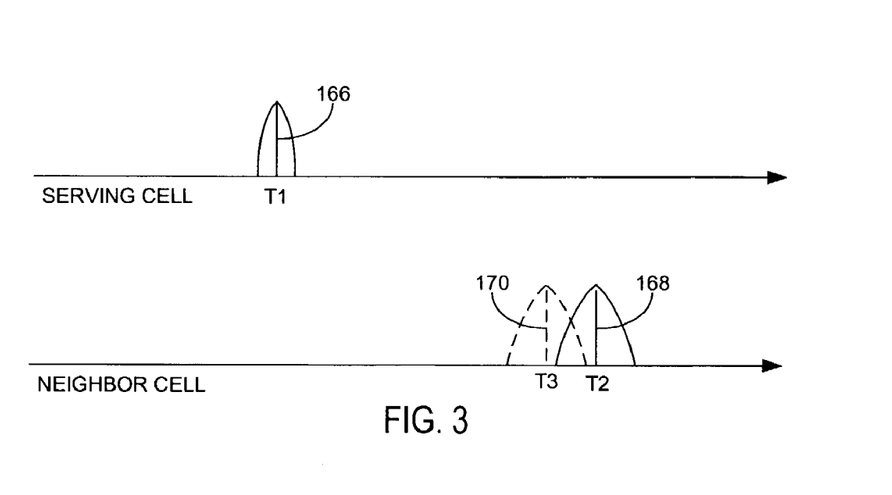
FIG. 3 is an illustration of arrival times calculated for the synchronization bursts of FIG. 2.

In order to determine the arrival time of a synchronization burst, the mobile station 110 may perform a correlation between the data encoded in the synchronization burst and the known training sequence code. For example, since the mobile station 110 knows the training sequence code that will be included in the synchronization burst 150, the mobile station 110 can do a correlation between the known training sequence code and the data included in the synchronization burst 150, which also will include the training sequence code, to determine the arrival time or time stamp T1 for the synchronization burst 150. Similarly, the mobile station 110 can conduct a correlation between the training sequence code and the data included in the synchronization burst 154, which also includes the training sequence code, to attempt to determine the arrival time or time stamp T2.

Unfortunately, co-channel or other interference caused by noise, content of the synchronization bursts, multiple cells using the same frequency, etc. may cause create difficulty for the mobile station 110 in decoding the synchronization burst 154 properly. Thus, the mobile station 110 may determine an inaccurate arrival time or time stamp 170, denoted as time T3 (which can be before or after the time T2), for the synchronization burst 154 and, as a result, the mobile station 110 may determine inaccurately the observed time difference between the synchronization burst 152 and the synchronization burst 154 as T3 minus T2.

In order to obtain an accurate determination of the arrival time T2 for the synchronization burst 154 sent by the base terminal station 120, the mobile station 110 may use additional information when conducting a correlation between known data and the data in the synchronization burst 154, as will be discussed in more detail below.

Figure 4:
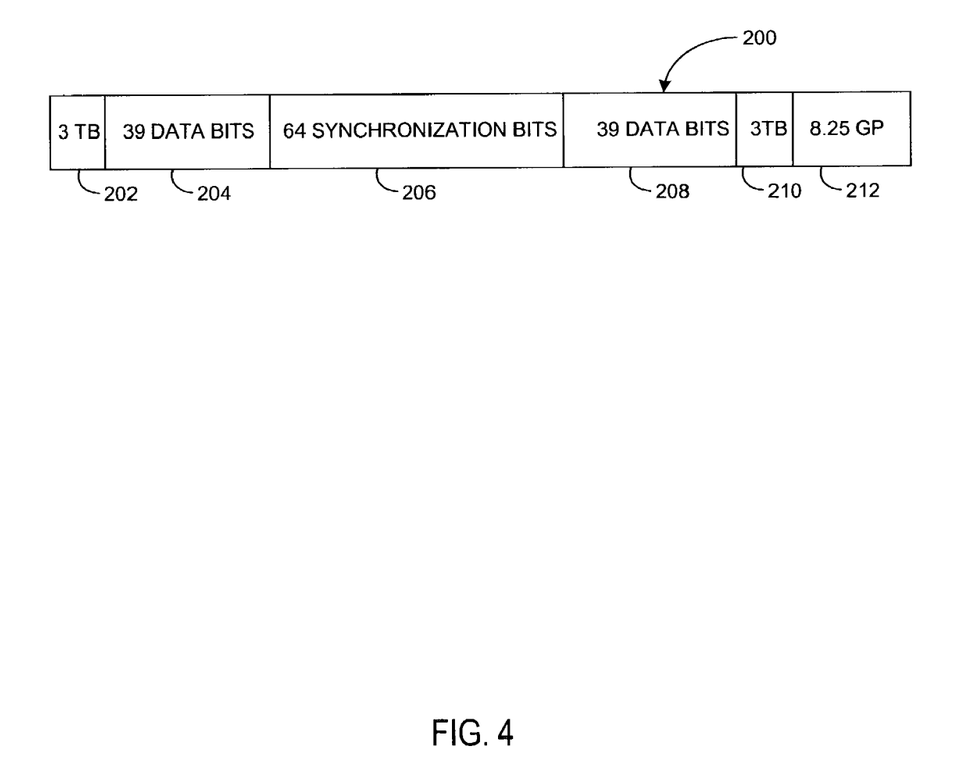
FIG. 4 is an illustration of a conventional synchronization burst.

Now referring to FIG. 4, a typical structure 200 of a synchronization burst is illustrated. Each synchronization burst 200 will include three tail bits (TB) 202, followed by thirty-nine data bits 204, followed by sixty-four synchronization bits 206, followed by thirty-nine data bits 208, followed by three tail bits 210, and then approximately eight guard bits (GP) 212. The tail bits 202, 210 are usually zeros and are used for signifying the start and end of the synchronization burst 200. The thirty-nine data bits 204 and the thirty-nine data bits 208 may be encrypted. In addition the sixty-four synchronization bits 206 may be encrypted and typically include the training sequence code for the synchronization burst. For purposes of explanation, the thirty-nine data bits 204 may be referred to as the left side or leading data bits for the synchronization burst 200 while the thirty-nine data bits 208 may be referred to as the right side or trailing data bits for the synchronization burst 200.

Process Description

Figure 5:
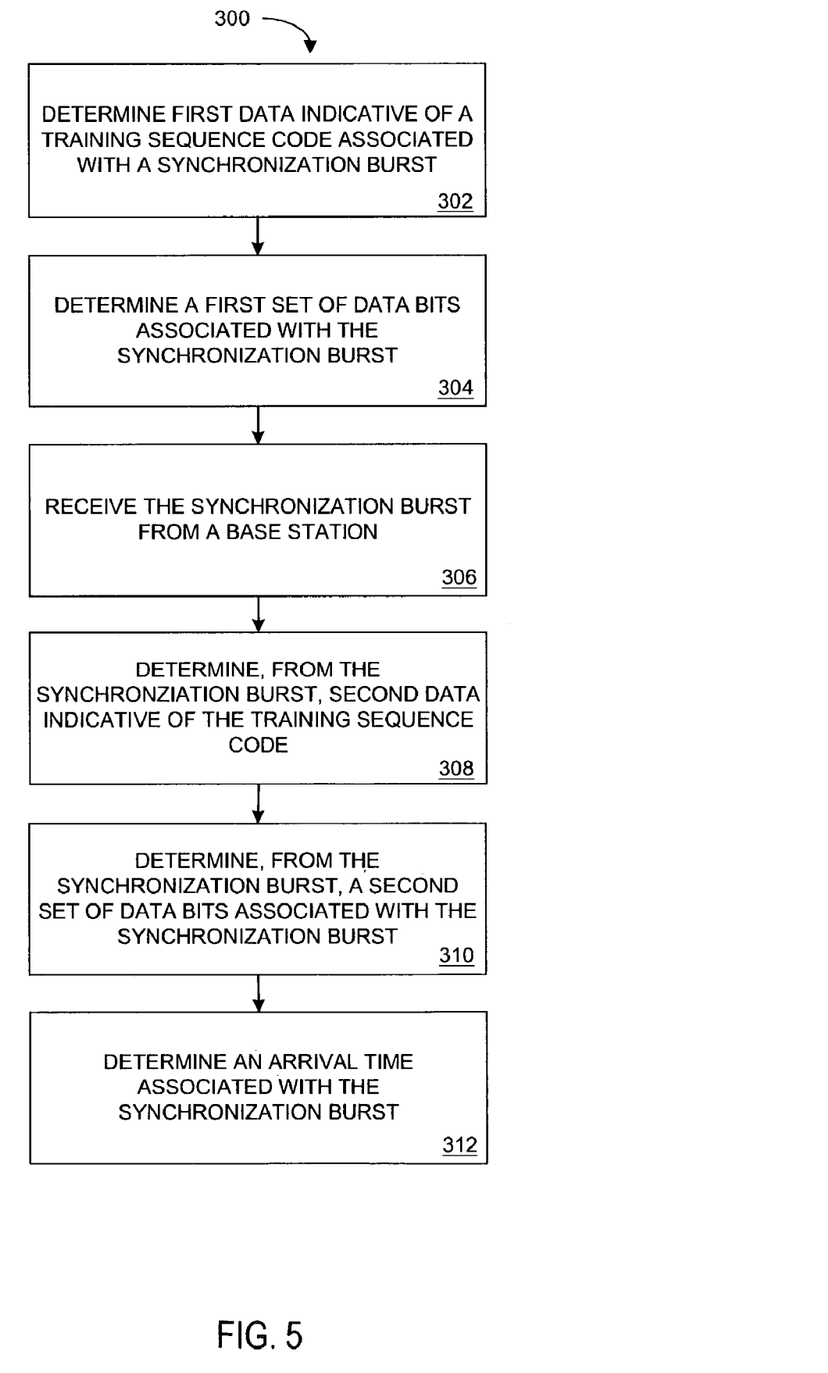
FIG. 5 is a flowchart of a first embodiment of a method in accordance with the present invention.

Reference is now made to FIG. 5, where a flow chart 300 is shown which represents the operation of a first embodiment of the present invention. The particular arrangement of elements in the flow chart 300 is not necessarily meant to imply a fixed order to the steps; embodiments of the present invention can be practiced in any order that is practicable. In some embodiments, some or all of the steps of the method 300 may be performed or completed by a mobile station, such as the mobile station 110.

In general, with the method 300 the mobile station 110 uses more than just the training sequence code of a synchronization burst to conduct a correlation in order to determine the arrival time of the synchronization burst. That is, the mobile station may use the left side data bits and/or the right side data bits in addition to the training sequence code in the correlation. While the training sequence code for a synchronization burst is known to the mobile station 110, the mobile station 110 may have to determine what the left side data bits and/or right side data bits are for the synchronization burst. In some embodiments, the mobile station 110 may be able to decode the synchronization burst and obtain the left side data bits and/or right side data bits directly. In other embodiments, the mobile station 110 may use assistance data obtained from another source in order to obtain the left side data bits and/or the right side data bits for the synchronization burst.

Processing begins at a step 302 during which the mobile station 110 determines first data indicative of a training sequence code for a synchronization burst. For example, the mobile station 110 may determine the training sequence code 158 for the synchronization burst 154 prior to receiving or detecting the synchronization burst 154. As previously discussed above, training sequence codes for different synchronization bursts may be the same. Thus, a base terminal station, network component, or other device may provide training sequence code information to the mobile station 110 or the mobile station 110 may retrieve the training sequence code information from base terminal station, network component, or other device. Similarly, the training sequence code information may be programmed or stored in the mobile station 110.

During a step 304, the mobile station 100 may determine a first set of data bits associated with the synchronization burst. For example, the mobile station 110 may identify or detect the leading or left side set of thirty nine data bits in the synchronization burst and/or the trailing or right side set of thirty nine data bits in the synchronization burst.

There are several ways in which the mobile station 110 may determine the first set of data bits. For example, the mobile station 110 may receive assistance data from a base terminal station or other device in the network 110. The assistance data may include information such as the absolute radio frequency channel number (ARFCN), base terminal station identity code (BSIC), multiframe offset value for the neighbor cell (e.g., the cell 106) associated with the base terminal station, etc. The multiframe offset has an integer value between zero and fifty-one and represents the difference in the start times of multiframe structure between a serving cell and a neighbor cell. From the multiframe offset value, the mobile station 110 can determine the frame number of a synchronization burst of the neighbor cell. The frame number of the serving cell will be known to the mobile station 110 or can be determined by the mobile station 110.

Knowing the frame number of the serving cell at the time a synchronization burst of the neighbor cell is detected or observed allows the frame number for the synchronization burst of the neighbor cell to be calculated as multiframe offset plus the current frame number of the serving cell. For example, if the multiframe offset is ten, and the current serving cell FN is thirty, then the neighbor cell's synchronization burst frame number will be forty (e.g., 40=10+30). Once the base terminal station identity code (BSIC) and the frame number for the synchronization burst of the neighbor cell, the first set of data bits from the synchronization burst of the neighbor cell can be determined. For example, referring to 3GPP TS 05.03 V8.6.1 (2001-01) entitled $3^{rd}$ Generation Partnership Project; Technical Specification Group GERAN; Channel coding (Release 1999), the contents of all of which are incorporated herein by reference for all purposes, the encrypted bits (referred to herein as data bits) can be obtained from the BSIC, and FN (Frame Number).

As another example, if the mobile station 110 has received the synchronization burst from the neighbor cell (i.e., after a step 306 described below), the mobile station may be able to decode or determine the first set of data bits. For example, the mobile station 110 may be able to decode the leading set of thirty-nine data bits in the synchronization burst 154.

During the step 306, the mobile station 110 receives, detects, or otherwise determines the synchronization burst from a base terminal station. For example, the mobile station 110 may receive the synchronization burst 154 from the base terminal station 120. In some embodiments, the step 306 may occur before the step 302 and/or the step 304.

During a step 308, the mobile station 110 determines second data indicative of a training sequence code associated with a synchronization burst. For example, the mobile station 110 may receive or detect the synchronization burst 154 associated with the cell 106 and from the synchronization burst 154 identify or detect the training sequence code 158.

During a step 310, the mobile station 110 determines a second set of data bits associated with the synchronization burst 154. For example, the mobile station 110 may identify or detect the leading or left side set of thirty nine data bits in the synchronization burst 154 and/or the trailing or right side set of thirty nine data bits in the synchronization burst 154. In some embodiments, the step 310 may occur before the step 308 or simultaneously with the step 308. Also, in some embodiments, the steps 308 and 310 may be combined. Preferably, the mobile station 110 determines the same set of bits for the second set during the step 310 as it did during the step 304. In addition, the mobile station knows the times associated with the different bits.

During a step 312, the mobile station 110 determines an arrival time for the synchronization burst received during the step 304. The mobile station 110 conducts a correlation using the first set of data bits determined during the step 304 and the training sequence code determined during the step 302 with the second set of data bits determined during the step 310 and the training sequence code determined during the step 308. Thus, the mobile station 110 is using more bits to conduct the correlation. Since the mobile station knows all of the data bits and the timing information for the training sequence code determined during the step 308 and the second set of data bits determined during the step 310, the mobile station 110 is able to conduct a more accurate correlation, thereby resulting in a more accurate result for the arrival time or time stamp for the synchronization burst.

As illustrated by the discussion above, correlation of a synchronization burst may occur in at least four ways:
1. Correlation of the synchronization burst using the left side data bits and training sequence code of the synchronization burst;
2. Correlation of the synchronization burst using the training sequence code and right side data bits of the synchronization burst;
3. Correlation of the synchronization burst using the left side data bits, the training sequence code, and the right side data bits of the synchronization burst; or
4. Correlation of the synchronization burst up to three times using the left side data bits, the training sequence code, and the right side data bits of the synchronization burst separately, and then calculating the arrival time of the synchronization based on all three calculations.

In addition, each of the four correlation schemes may be conduct in two ways, either before conversion of the bits into a digital signal (i.e., before coding, modulation, etc.) or after conversion of the bits into a digital signal (i.e., after coding modulation, etc.).

In some embodiments, once the mobile station 110 has determined the arrival time of the synchronization burst, the mobile station 110 may provide the arrival time information to another device, use the information to determine an observed time difference between two synchronization bursts, providing information regarding the determined observed time difference, etc. In some embodiments, the method 300 may include the mobile station 110 received or otherwise obtaining assistance data or other information for use in determining the left side data bits and/or the right side data bits for a synchronization burst.

Figure 6:
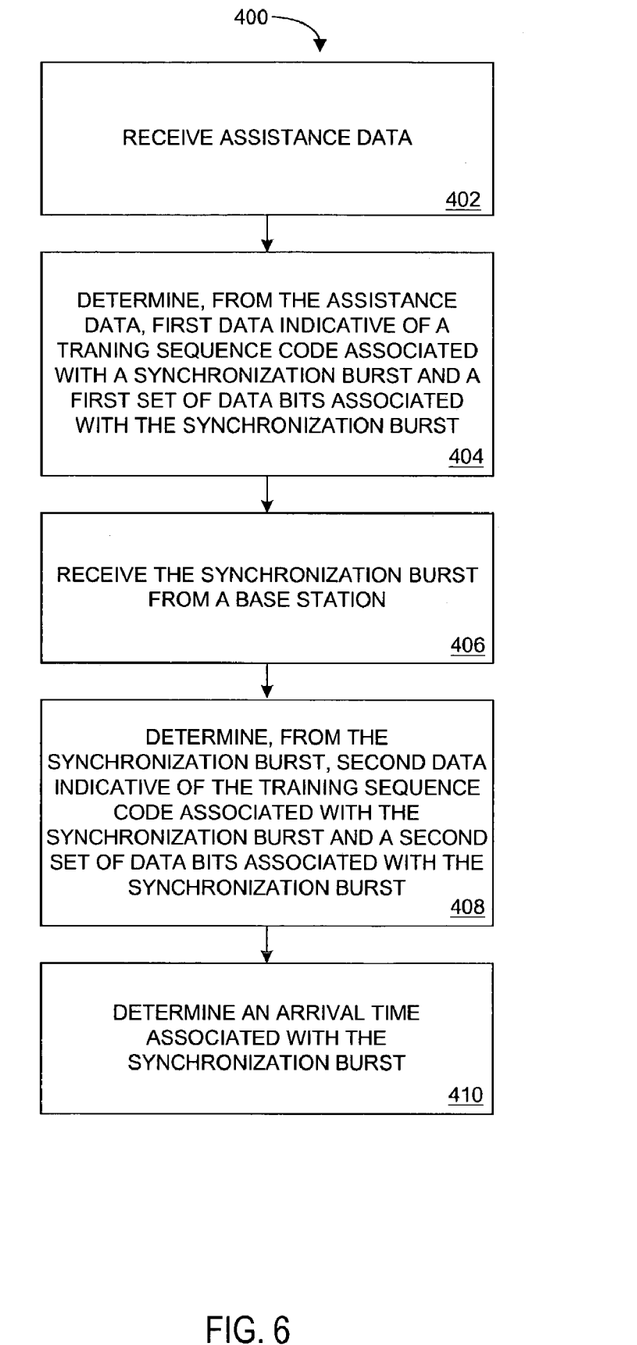
FIG. 6 is a flowchart of a second embodiment of a method in accordance with the present invention.

Reference is now made to FIG. 6, where a flow chart 400 is shown which represents the operation of a second embodiment of the present invention. The particular arrangement of elements in the flow chart 400 is not meant to imply a fixed order to the steps; embodiments of the present invention can be practiced in any order that is practicable. In some embodiments, some or all of the steps of the method 400 may be performed or completed by a mobile station.

Processing begins at a step 402 during which the mobile station 110 receives or otherwise determines assistance data. As previously discussed above, in some embodiments, assistance data may be or include information such as the absolute radio frequency channel number (ARFCN), base terminal station identity code (BSIC), multiframe offset value for the neighbor cell (e.g., the cell 106) associated with the base terminal station, etc.

During a step 404, the mobile station 110 determines, from the assistance data received during step 402, data indicative of a training sequence code associated with a synchronization burst and a first set of data bits associated with the synchronization burst.

During a step 406, the mobile station 110 receives the synchronization burst from a base station. In some embodiments, the step 406 may occur prior the step 402 and/or the step 404.

During a step 408, the mobile station 110 determines data bits and a training sequence code from the synchronization burst received during the step 406.

During a step 410, the mobile station determines an arrival time associated with the synchronization burst based on the data determined during the steps 404, 408. The step 410 is similar to the step 312 previously discussed above.

Mobile Station

Figure 7:
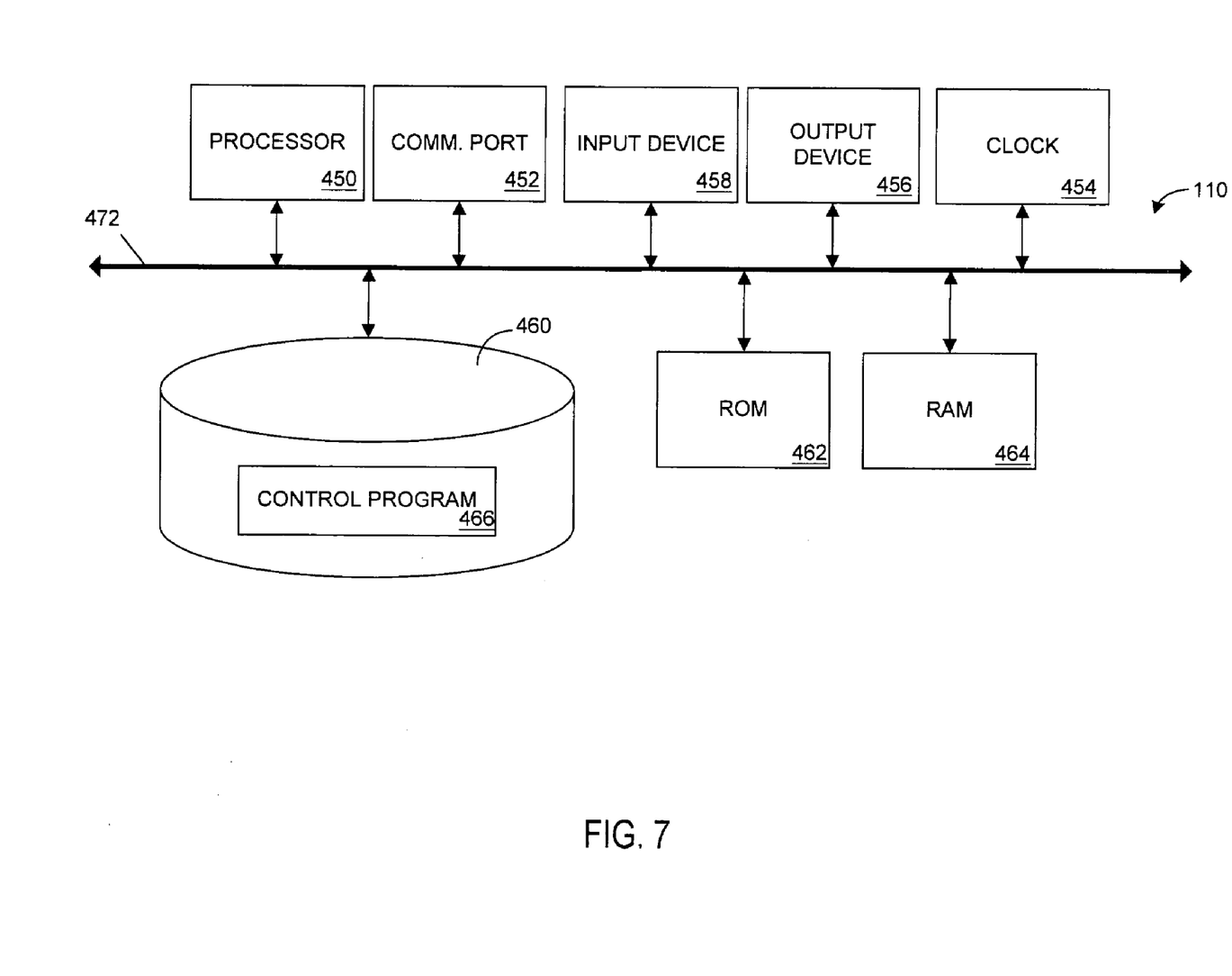
FIG. 7 is a block diagram of potential components for an embodiment of the mobile station of FIG. 1.

Now referring to FIG. 7, a representative block diagram of a mobile station 110 is illustrated. The mobile station 110 may include a processor, microchip, central processing unit, or computer 450 that is in communication with or otherwise uses or includes one or more communication ports 452 for communicating with user devices and/or other devices. Communication ports may include such things as local area network adapters, wireless communication devices, Bluetooth technology, etc. The mobile station 110 also may include an internal clock or timing element 454 to maintain an accurate time and date for the mobile station 110, create time stamps for communications received or sent by the mobile station 110, etc.

If desired, the mobile station 110 may include one or more output devices 456 such as a printer, infrared or other transmitter, antenna, audio speaker, display screen or monitor, text to speech converter, etc., as well as one or more input devices 458 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the mobile station 110 may include a memory or data storage device 460 to store information, software, databases, communications, device drivers, codes, etc. The memory or data storage device 460 preferably comprises an appropriate combination of magnetic, optical and/or semiconductor memory, and may include, for example, Random Read-Only Memory (ROM), Random Access Memory (RAM), a tape drive, flash memory, a floppy disk drive, a Zip™ disk drive, a compact disc and/or a hard disk. The mobile station 110 also may include separate ROM 462 and RAM 464.

The processor 450 and the data storage device 460 in the mobile station 110 each may be, for example: (i) located entirely within a single computer or other computing device; or (ii) connected to each other by a remote communication medium, such as a serial port cable, telephone line or radio frequency transceiver. In one embodiment, the mobile station 110 may comprise one or more computers that are connected to a remote mobile station computer for maintaining databases.

In some embodiments, a conventional personal computer, host computer, or workstation with sufficient memory and processing capability may be used as the mobile station 110. In one embodiment, the mobile station 110 operates as or includes a Web mobile station for an Internet environment.

The mobile station 110 preferably is capable of high volume transaction processing, performing a significant number of mathematical calculations in processing communications and database searches. A Pentium™ microprocessor, such as the Pentium III™ or IV™ microprocessor manufactured by Intel Corporation, may be used for the processor 450. Equivalent processors are available from Motorola, Inc., AMD, or Sun Microsystems, Inc. The processor 450 also may comprise one or more microprocessors, computers, computer systems, etc.

Software may be resident and operating or operational on the mobile station 110. The software may be stored on the data storage device 460 and may include a control program 466 for operating the mobile station, databases, etc. The control program 466 may control the processor 450. The processor 450 preferably performs instructions of the control program 466, and thereby operates in accordance with the present invention, and particularly in accordance with the methods described in detail herein. The control program 466 may be stored in a compressed, uncompiled and/or encrypted format. The control program 466 furthermore includes program elements that may be necessary, such as an operating system, a database management system and device drivers for allowing the processor 450 to interface with peripheral devices, databases, etc. Appropriate program elements are known to those skilled in the art, and need not be described in detail herein. The mobile station 110 also may include or store information regarding base stations, cells, bursts, communications, etc.

According to some embodiment of the present invention, the instructions of the control program may be read into a main memory from another computer-readable medium, such as from the ROM 462 to the RAM 464. Execution of sequences of the instructions in the control program causes the processor 450 to perform the process steps described herein. In alternative embodiments, hard-wired circuitry may be used in place of, or in combination with, software instructions for implementation of some or all of the methods of the present invention. Thus, embodiments of the present invention are not limited to any specific combination of hardware and software.

The processor 450, communication port 452, clock 454, output device 456, input device 458, data storage device 460, ROM 462, and RAM 464 may communicate or be connected directly or indirectly in a variety of ways. For example, the processor 450, communication port 452, clock 454, output device 456, input device 458, data storage device 460, ROM 462, and RAM 464 may be connected via a bus 472.

While specific implementations and hardware/software configurations for the mobile station 110 have been illustrated, it should be noted that other implementations and hardware/software configurations are possible and that no specific implementation or hardware/software configuration is needed for the mobile station 110.

The methods of the present invention may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, many, if not all, of the steps for the methods described above are optional or can be combined or performed in one or more alternative orders or sequences without departing from the scope of the present invention and the claims should not be construed as being limited to any particular order or sequence, unless specifically indicated.

Each of the methods described above can be performed on a single computer, computer system, microprocessor, etc. In addition, two or more of the steps in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

Although the present invention has been described with respect to various embodiments thereof, those skilled in the art will note that various substitutions may be made to those embodiments described herein without departing from the spirit and scope of the present invention.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

What is claimed:

1. A method for determining an arrival time associated with a synchronization burst, comprising:
    determining first data indicative of a training sequence code associated with a first synchronization burst;
    determining a first set of data bits associated with said first synchronization burst;
    receiving said first synchronization burst from a base station;
    determining, from said first synchronization burst, second data indicative of said training sequence code;
    determining, from said first synchronization burst, a second set of data bits associated with said synchronization burst; and
    determining a first arrival time associated with said first synchronization burst based on said first data indicative of said training sequence code, said second data indicative of said training sequence code, said first said of data bits, and said second set of data bits, wherein said first set of data bits includes thirty-nine data bits from said first synchronization burst and said second set of data bits includes said thirty-nine data bits from said first synchronization burst.

2. The method of claim 1, further comprising:
    receiving assistance data.

3. The method of claim 2, wherein said receiving assistance data includes receiving data indicative of an absolute radio frequency channel number, a base station identity code, and a multiframe offset.

4. The method of claim 2, wherein said determining first data indicative of a training sequence code associated with a first synchronization burst includes determining said first data from said assistance data.

5. The method of claim 4, wherein said determining a first set of data bits associated with said first synchronization burst includes determining said first set of data bits from said assistance data.

6. The method of claim 1, wherein said determining first data indicative of a training sequence code associated with a first synchronization burst includes receiving data from a base terminal station indicative of said training sequence code.

7. The method of claim 1, wherein said determining a first set of data bits associated with said first synchronization burst includes decoding said first synchronization burst.

8. The method of claim 1, wherein said determining an arrival time associated with said first synchronization burst based on said first data indicative of said training sequence code, said second data indicative of said training sequence code, said first set of data bits, and said second set of data bits includes correlating said first data indicative of said training sequence code and first set of data bits with said second data indicative of said training sequence code and said second set of data bits.

9. The method of claim 1, further comprising:
providing data indicative of said first arrival time.

10. The method of claim 1, further comprising:
determining an observed time difference between said first arrival time of said first synchronization burst and a second arrival time associated with a second synchronization burst.

11. The method of claim 10, further comprising:
providing data indicative of said observed time difference.

12. The method of claim 10, wherein said first synchronization burst is associated with a neighbor cell and said second synchronization burst is associated with a serving cell.

13. The method of claim 1, wherein said fist set of data bits are encrypted.

14. The method of claim 13, further comprising:
decoding said first set of data bits.

15. A method for determining an arrival time associated with a synchronization burst, comprising:
determining first data indicative of a training sequence code associated with a first synchronization burst;
determining a first set of data bits associated with said first synchronization burst;
receiving said first synchronization burst from a base station;
determining, from said first synchronization burst, second data indicative of said training sequence code;
determining, from said first synchronization burst, a second set of data bits associated with said synchronization burst; and
determining a first arrival time associated with said first synchronization burst based on said first data indicative of said training sequence code, said second data indicative of said training sequence code, said first said of data bits, and said second set of data bits, wherein said first set of data bits includes seventy-eight data bits from said first synchronization burst and said second set of data bits includes said seventy-eight data bits from said first synchronization burst.

16. The method of claim 15, further comprising:
receiving assistance data.

17. The method of claim 16, wherein said receiving assistance data includes receiving data indicative of an absolute radio frequency channel number, a base station identity code, and a multiframe offset.

18. The method of claim 16, wherein said determining first data indicative of a training sequence code associated with a first synchronization burst includes determining said first data from said assistance data.

19. The method of claim 18, wherein said determining a first set of data bits associated with said first synchronization burst includes determining said first set of data bits from said assistance data.

20. The method of claim 15, wherein said determining first data indicative of a training sequence code associated with a first synchronization burst includes receiving data from a base terminal station indicative of said training sequence code.

21. The method of claim 15, wherein said determining a first set of data bits associated with said first synchronization burst includes decoding said first synchronization burst.

22. The method of claim 15, wherein said first set of data bits includes seventy-eight data bits from said first synchronization burst and said second set of data bits includes said seventy-eight data bits from said first synchronization burst.

23. The method of claim 15, further comprising:
providing data indicative of said first arrival time.

24. The method of claim 15, further comprising:
determining an observed time difference between said first arrival time of said first synchronization burst and a second arrival time associated with a second synchronization burst.

25. The method of claim 24, wherein said first synchronization burst is associated with a neighbor cell and said second synchronization burst is associated with a serving cell.

26. The method of claim 24, further comprising:
providing data indicative of said observed time difference.

27. The method of claim 15, wherein said fist set of data bits are encrypted.

28. The method of claim 27, further comprising:
decoding said first set of data bits.

29. A method for determining an arrival time associated with a synchronization burst, comprising:
receiving assistance data;
determining, from said assistance data, first data indicative of a training sequence code associated with a first synchronization burst and a first set of data bits associated with said first synchronization burst;
receiving said first synchronization burst from a base station;
determining, from said first synchronization burst, second data indicative of said training sequence code and a second set of data bits associated with said synchronization burst; and
determining a first arrival time associated with said first synchronization burst based on said first data indicative of said training sequence code, said second data indicative of said training sequence code, said first said of data bits, and said second set of data bits, wherein said first set of data bits includes thirty-nine data bits from said first synchronization burst and said second set of data bits includes said thirty-nine data bits from said first synchronization burst.

30. The method of claim 29, wherein said assistance data includes data indicative of an absolute radio frequency channel number, a base station identity code, and a multiframe offset.

31. A system for determining an arrival time associated with a synchronization burst, comprising:
a memory;
a communication port; and
a processor connected to said memory and said communication port, said processor being operative to:

determine first data indicative of a training sequence code associated with a first synchronization burst;

determine a first set of data bits associated with said first synchronization burst;

receive said first synchronization burst from a base station;

determine, from said first synchronization burst, second data indicative of said training sequence code;

determine, from said first synchronization burst, a second set of data bits associated with said synchronization burst; and determine a first arrival time associated with said first synchronization burst based on said first data indicative of said training sequence code, said second data indicative of said training sequence code, said first said of data bits, and said second set of data bits, wherein said first set of data bits includes thirty-nine data bits from said first synchronization burst and said second set of data bits includes said thirty-nine data bits from said first synchronization burst.

32. A computer program product in a computer readable medium for determining an arrival time associated with a synchronization burst, comprising:

instructions for obtaining determining first data indicative of a training sequence code associated with a first synchronization burst;

instructions for obtaining a first set of data bits associated with said first synchronization burst;

instructions for obtaining receiving said first synchronization burst from a base station;

instructions for obtaining determining, from said first synchronization burst, second data indicative of said training sequence code;

instructions for obtaining, from said first synchronization burst, a second set of data bits associated with said synchronization burst; and instructions for obtaining determining a first arrival time associated with said first synchronization burst based on said first data indicative of said training sequence code, said second data indicative of said training sequence code, said first said of data bits, and said second set of data bits, wherein said first set of data bits includes thirty-nine data bits from said first synchronization burst and said second set of data bits includes said thirty-nine data bits from said first synchronization burst.

33. A method for determining an arrival time associated with a synchronization burst, comprising:

determining first data indicative of a training sequence code associated with a first synchronization burst;

determining a first set of data bits associated with said first synchronization burst;

receiving said first synchronization burst from a base station;

determining, from said first synchronization burst, second data indicative of said training sequence code;

determining, from said first synchronization burst, a second set of data bits associated with said synchronization burst; and determining a first arrival time associated with said first synchronization burst based on said first data indicative of said training sequence code, said second data indicative of said training sequence code, said first said of data bits, and said second set of data bits, wherein said first set of data bits includes thirty-nine data bits from said first synchronization burst and said second set of data bits includes said a thirty-nine data bits from said first synchronization burst.

34. A method for determining an arrival time associated with a synchronization burst, comprising:

receiving assistance data;

determining, from said assistance data, first data indicative of a training sequence code associated with a first synchronization burst and a first set of data bits associated with said first synchronization burst;

receiving said first synchronization burst from a base station;

determining, from said first synchronization burst, second data indicative of said training sequence code and a second set of data bits associated with said synchronization burst; and determining a first arrival time associated with said first synchronization burst based on said first data indicative of said training sequence code, said second data indicative of said training sequence code, said first said of data bits, and said second set of data bits, wherein said first set of data bits includes seventy-eight data bits from said first synchronization burst and said second set of data bits includes said seventy-eight data bits from said first synchronization burst.

35. A system for determining an arrival time associated with a synchronization burst, comprising:

a memory;

a communication port; and a processor connected to said memory and said communication port, said processor being operative to:

determine first data indicative of a training sequence code associated with a first synchronization burst;

determine a first set of data bits associated with said first synchronization burst;

receive said first synchronization burst from a base station;

determine, from said first synchronization burst, second data indicative of said training sequence code;

determine, from said first synchronization burst, a second set of data bits associated with said synchronization burst; and determine a first arrival time associated with said first synchronization burst based on said first data indicative of said training sequence code, said second data indicative of said training sequence code, said first said of data bits, and said second set of data bits, wherein said first set of data bits includes seventy-eight data bits from said first synchronization burst and said second set of data bits includes said seventy-eight data bits from said first synchronization burst.

36. A computer program product in a computer readable medium for determining an arrival time associated with a synchronization burst, comprising:

instructions for obtaining determining first data indicative of a training sequence code associated with a first synchronization burst;

instructions for obtaining a first set of data bits associated with said first synchronization burst;

instructions for obtaining receiving said first synchronization burst from a base station;

instructions for obtaining determining, from said first synchronization burst, second data indicative of said training sequence code;

instructions for obtaining, from said first synchronization burst, a second set of data bits associated with said synchronization burst; and instructions for obtaining determining a first arrival time associated with said first synchronization burst based on said first data indicative of said training sequence code, said second data indicative of said training sequence code, said first said of data bits, and said second set of data bits, wherein said first set of data bits includes seventy-eight data bits from said first synchronization burst and said second set of data bits includes seventy-eight data bits from said first synchronization burst.

* * * * *